United States Patent

Ghosh et al.

[11] Patent Number: 5,961,932
[45] Date of Patent: *Oct. 5, 1999

[54] REACTION CHAMBER FOR AN INTEGRATED MICRO-CERAMIC CHEMICAL PLANT

[75] Inventors: Syamal K. Ghosh; Dilip K. Chatterjee, both of Rochester; Edward P. Furlani, Lancaster, all of N.Y.

[73] Assignee: Eastman Kodak Company, Rochester, N.Y.

[*] Notice: This patent is subject to a terminal disclaimer.

[21] Appl. No.: 08/879,345

[22] Filed: Jun. 20, 1997

[51] Int. Cl.$^6$ ....................................................... B01J 8/00
[52] U.S. Cl. ........................ 422/193; 422/195; 422/188; 422/199; 422/198; 422/224; 422/232; 422/239; 422/236; 422/129; 422/191
[58] Field of Search ..................................... 422/191, 200, 422/224, 236, 188, 129, 211, 50, 70, 101, 103, 68.1, 193; 165/185, 166, 167; 156/89.12; 428/178, 172, 166; 210/500.1, 500.26

[56] References Cited

U.S. PATENT DOCUMENTS

| | | | |
|---|---|---|---|
| 4,516,632 | 5/1985 | Swift et al | 165/167 |
| 4,991,283 | 2/1991 | Johnson et al. | 29/595 |
| 5,230,866 | 7/1993 | Shartle et al. | 422/103 |
| 5,534,328 | 7/1996 | Ashmead et al. | 428/166 |
| 5,580,523 | 12/1996 | Bard | 422/50 |
| 5,595,712 | 1/1997 | Harbster et al. | 422/129 |
| 5,611,214 | 3/1997 | Wegeng et al. | 62/498 |
| 5,639,423 | 6/1997 | Northrup et al. | 122/50 |
| 5,726,026 | 3/1998 | Wilding et al. | 435/7.21 |
| 5,811,062 | 9/1998 | Wegeng et al. | 422/129 |
| 5,846,396 | 12/1998 | Zanzucchi et al. | 204/601 |
| 5,849,208 | 12/1998 | Hayes et al. | 216/94 |

*Primary Examiner*—Hien Tran
*Assistant Examiner*—Susan K. Ohorodnik
*Attorney, Agent, or Firm*—Raymond L. Owens

[57] ABSTRACT

An integrated micro-ceramic chemical plant having a unitary ceramic body formed from multiple ceramic layers in the green state which are sintered together includes a unitary ceramic body defining a reaction chamber and first passages are provided for communication with the reaction chamber so that two or more fluids may be delivered to such reaction chamber, a permeable partition wall being provided within the reaction chamber to permit the mixing of fluids during a reaction process. The integrated micro-ceramic chemical plant further includes a filtering chamber including filters disposed in such chamber for separating the solid reaction products from the fluid and for retrieving desired solid reaction products; and other passages for directing the desired solid reaction products to exit from the unitary ceramic body and other passages for directing the desired liquid reaction products to exit from the unitary ceramic body.

10 Claims, 5 Drawing Sheets

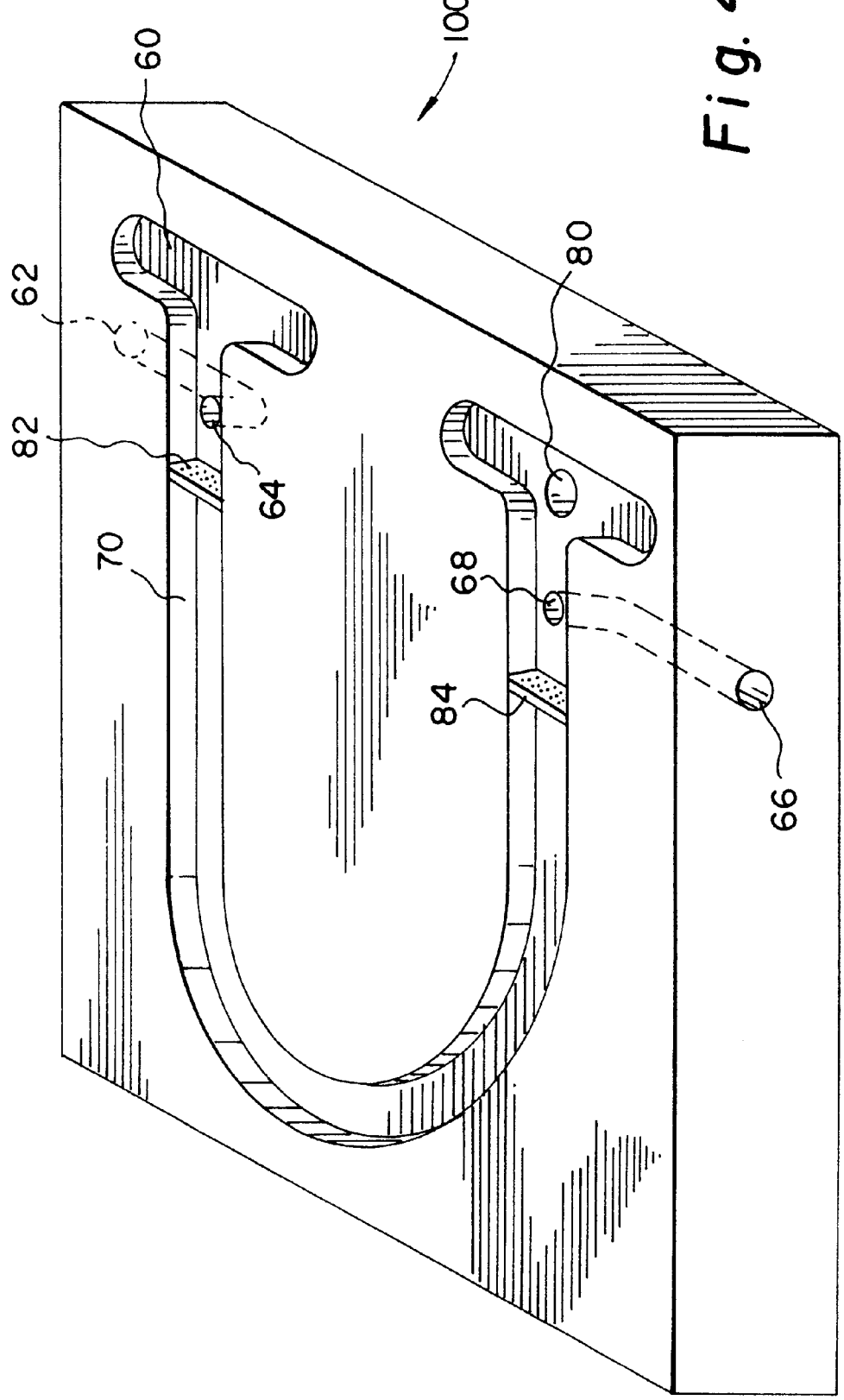

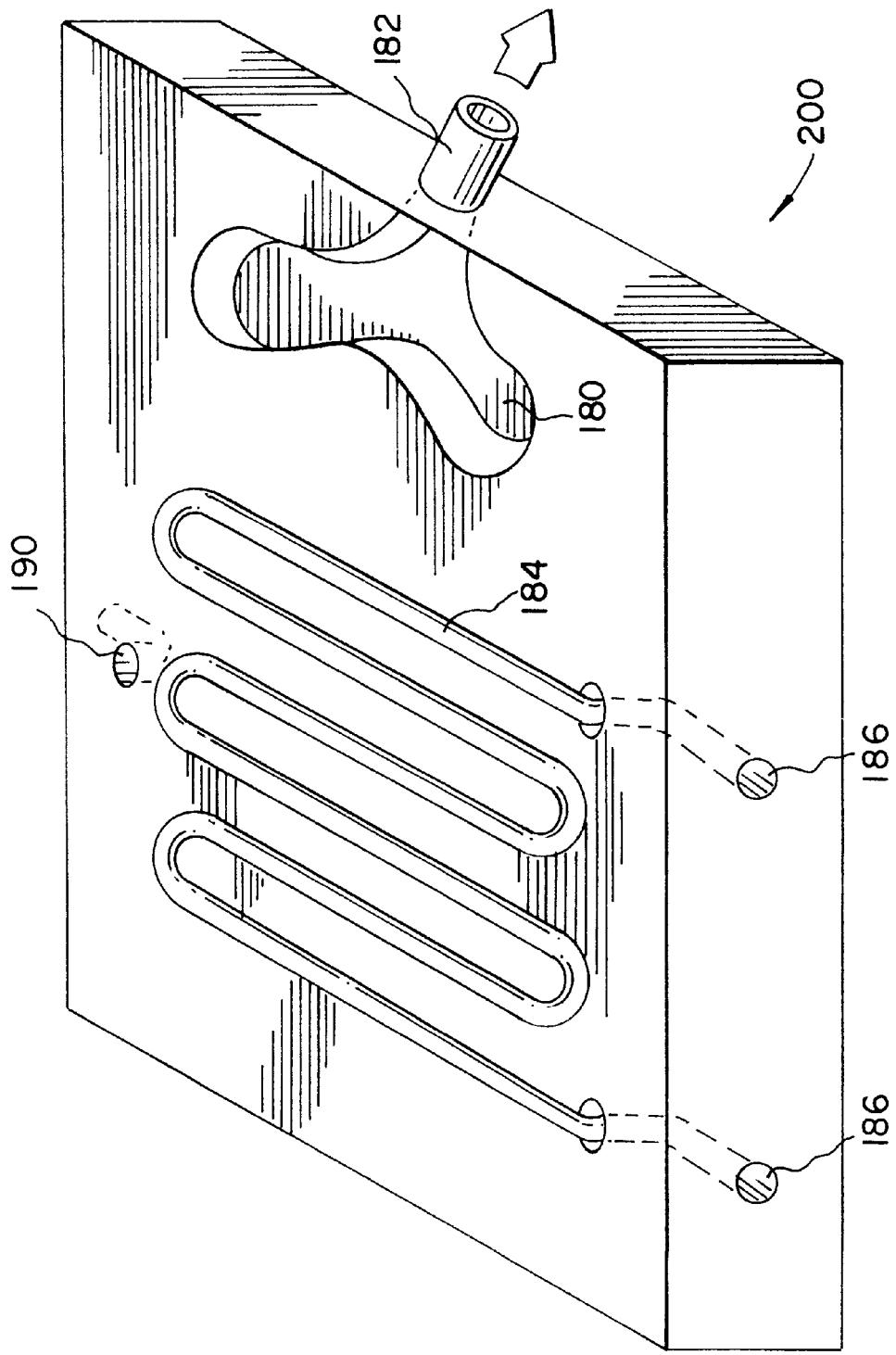

REACTION CHAMBER FOR AN INTEGRATED MICRO-CERAMIC CHEMICAL PLANT

CROSS REFERENCE TO RELATED APPLICATION

Reference is made to commonly assigned U.S. patent application Ser. No. 08/835,979, filed Apr. 11, 1997, entitled "Integrated Ceramic Micro-Chemical Plant" by Ghosh et al, the teachings of which are incorporated herein.

FIELD OF THE INVENTION

The present invention relates to a ceramic micro-chemical plant which can be used to produce chemicals by osmosis process. More particularly, the present invention relates to the reaction chamber used in producing such chemicals.

BACKGROUND OF THE INVENTION

Micro-engineering is a rapidly growing field which is liable to impact on many applications over the coming years. Three-dimensional micro-engineered devices and systems involving silicon planar technology can be produced with features from one to a few hundred microns having tolerances in micron or as small as submicron level. Most of the current micro-engineering technologies are evolved from the adaptation of thin films, photolithographic and etching technologies generally applied to silicon wafers on which silicon monoxide, silicon dioxide, silicon nitride and the like thin films are deposited and etched thereafter yielding planar configurations.

Advances have been made to study chemical processes based on microfluidic systems technology using planar structures on silicon chips. Predictive flow modeling has also been developed to realize the benefits from the microfluidic technology.

The performance of chemical processing is strictly governed by the mass transport and sometimes thermal transport properties of the system. It is therefore essential to understand how miniaturization affect the chemical processes. Laminar flow of an ideal fluid in a tube or channel is well characterized. Pfahler et al have demonstrated in an experiment using channels of various geometry on silicon wafers that there is an agreement between experiment and theory concluding that the conventional Hagen-Poiseuille equation is obeyed down to a scale of few microns. Laminar volume flow per unit time, $Q_f$, of an ideal fluid in a circular pipe is described by the Hagen-Poiseuille equation:

$$Q_f = \frac{\prod}{8\mu_f} \cdot \frac{dp}{dx} r^4$$

where $\mu_f$ and r are the fluid viscosity and tube radius respectively, dp/dx is the pressure gradient along the x-direction of flow.

As the channel widths are reduced, the fluid flow becomes more laminar which provides control over the distribution of material and that dictates that liquid mixing be achieved by diffusion or other molecular migration processes rather than by turbulence. This problem of mixing can be solved by commercially available software packages on computational fluid dynamics. A measure of degree of mixing, F, can be estimated from the expression $F=Dt/l^2$, where D is a reactant diffusion constant, t is contact time allowed for mixing and l is distance across a reactant stream. Quantitatively, mixing may be defined as substantial to nearly complete for F values from 0.1 to 1. Typical near complete mixing of two liquids in 1 second corresponds to channel widths of 100 $\mu$m.

Similarly problems exist with respect to heat transfer in micro-channels under laminar flow conditions. Understanding of this laminar heat flow process can be useful in designing and building micro heat exchangers and chemical micro-reactors.

The current planar silicon technologies are inadequate for the fabrication of an integrated and self-contained micro-chemical plant having embedded structures and unitary construction.

SUMMARY OF THE INVENTION

It is an object of the present invention to provide an integrated micro-ceramic chemical plant which is less than one thousandths the size of an average industrial chemical plant and which has a reaction chamber that effectively mixes and reacts chemicals.

This object is achieved in an integrated micro-ceramic chemical plant having a unitary ceramic body formed from multiple ceramic layers in the green state which are sintered together comprising:

(a) the unitary ceramic body defining a reaction chamber and first passage means for providing communication with the reaction chamber so that two or more fluids may be delivered to such reaction chamber, a permeable partition wall being provided within the reaction chamber to permit the mixing of fluids during a reaction process;

(b) the unitary ceramic body defining a filtering chamber including filtering means disposed in such chamber for separating the solid reaction products from the fluid and for retrieving desired solid reaction products;

(c) the unitary ceramic body defining second passage means for directing the desired solid reaction products to exit from the unitary ceramic body; and (d) the unitary ceramic body defining third passage means for directing the desired liquid reaction products to exit from the unitary ceramic body.

It is a feature of the present invention that integrated micro-ceramic chemical plants can be fabricated using micromolded ceramic technology in which the mixing and reaction of chemicals can be done in a highly effective manner. The reaction chamber in accordance with the present invention has one or more permeable walls which permit the mixing and reaction of two or more input chemicals. The permeable wall is ceramic and its permeability can be controlled by selecting the ceramic material and the porosity during the fabrication of the wall.

The improved reaction chamber in the integrated micro-ceramic chemical plant has a number of advantages:

1. By reducing the dimensions of the systems it is possible to ensure good mixing in a short time without the need to introduce turbulence. For those liquids which require turbulence mixing can also be incorporated in the integrated micro-ceramic chemical plant.

2. Indirect chemical reaction by osmosis process is made possible by providing semi- or permeable wall to effectively control the chemical reaction.

3. More efficient thermal control is possible because of large surface to volume ratio. Since relatively small quantities of chemicals are used in the micro-channels at any given time, the risk of chemical explosion is also reduced. It is also possible to shut down the process very quickly.

4. Ceramic and composite ceramic materials, in general, are chemically inert and, therefore, are resistant to corrosion.

5. Cleaning of the reaction chamber, passage tubes, inlet holes, etc. is much more efficient because they can be cleaned using acidic or caustic solutions as desired.

6. Most ceramic and composite ceramic materials are more thermally stable than silicon.

7. Ceramic and composite ceramic materials possess high strength and high hardness rendering them durable and wear resistant.

BRIEF DESCRIPTION OF THE DRAWINGS

FIG. 4 is a perspective of the third layer from the top of the ceramic body comprising filtering chamber; and FIG. 5 is a perspective of the fourth layer residing at the bottom of the ceramic body including chambers for retrieving the products and also heating the unitary ceramic body.

DETAILED DESCRIPTION OF THE PREFERRED EMBODIMENTS

Figure 1:
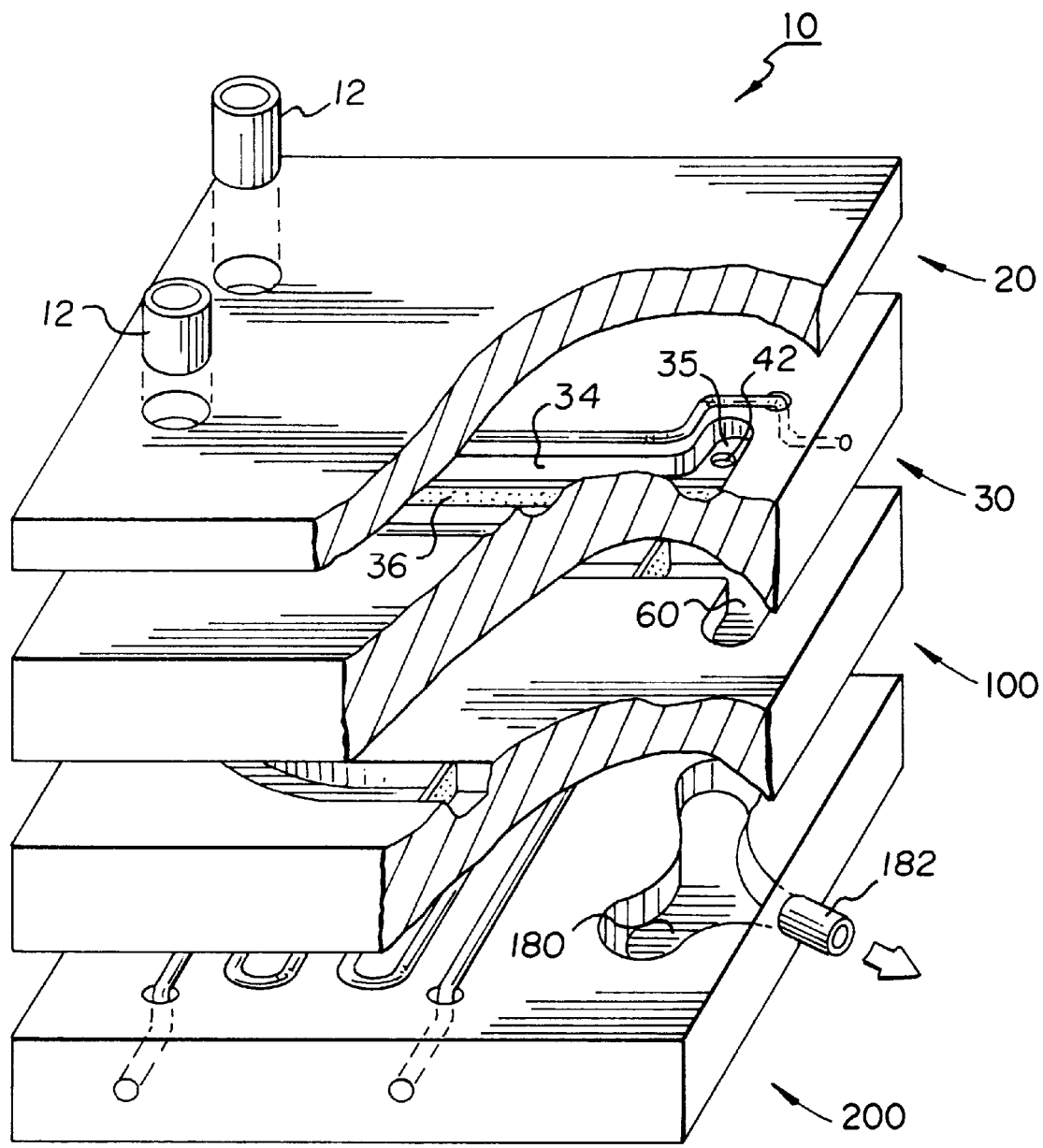
FIG. 1 is a perspective of the exploded view of an integrated micro-ceramic chemical plant.

Referring to FIG. 1 a perspective is illustrated of an integrated micromolded unitary ceramic block 10 including four different layers. The top layer 20 of the unitary ceramic block 10 includes a row of chemical delivery inlet conduits 12 (which may be tubes) on one side. It is to be noted that the top layer 20 may contain more than two conduits in a row. The conduits 12 lead directly to the second layer 30. The second layer 30 includes a reaction chamber 34 which has holding tanks 32 (see FIG. 3), discharge holes 42 disposed in an exiting chamber 35. It should be noted that reaction chamber 34 further includes a permeable (semi-permeable) partition wall 36 which is made of a porous and/or permeable ceramic material which permits the mixing of two different chemicals so that they can properly react as will be described later. The third layer 100 includes a receiving chamber 60 disposed directly below the exit chamber 35 in the second ceramic layer 30, filtration units for separating the solid from the liquid chemical and an exit chamber 80 (see FIG. 4). The bottom layer 200 includes a receiving chamber 180 disposed directly below the exit chamber 80 in the third layer, and a means 182 for dispensing the chemicals. The bottom layer is also provided with heating coils to heat the unitary ceramic body.

The present invention involves an integrated micro-ceramic chemical plant. When the term "micro" is used it refers to the fact that the features within the chemical plant have dimensions of about 100 micrometers or less. The unitary ceramic block 10 is formed by multiple ceramic layers in the green state which are sintered together. These layers can typically have dimensions 10 to 100 mm wide, 10 to 100 mm long, and 1 to 10 mm thick.

The use of the term "green" means that when particulate ceramic powder, preferably mixed with an organic binder is subjected to uniform compacting forces in order to provide an unsintered preform which has uniform density. One particular effective material is a tetragonal zirconia ceramic powder that can be micromolded to form the layer by standard methods such as injection molding, gel casting, tape casting, dry pressing or cold isostatic pressing. Other ceramic materials which can be used are $Al_2O_3$, AlN, BN, MgO, $Al_2O_3$—$ZrO_2$ composite, SiC, $Si_3N_4$ and other oxide and non-oxide ceramics and their composites thereof.

The features within each layer such as chambers, channels and passageways can be formed as follows:

(a) features like feed-through, through-holes, mixing chambers and reaction chambers can be formed in each layer in the green stage by incorporating those features in the mold. Approximately, 20% to 50% larger features must be made to account for shrinkage during sintering. The amount of shrinkage largely depends on the relative amount of organic binders in the ceramic mixture. Typically, 2% to 5% by weight organic binders are added for compaction processes such as cold isostatic pressing and dry pressing. On the other hand, 10% to 40% by weight organic binders are added for compaction processes such as gel casting, tape casting and injection molding.

(b) features like embedded coils and heating coils can be formed by placing sacrificial members comprising organic polymers which are burned away during the sintering process. The details of forming embedded microfeatures are described in the commonly assigned U.S. patent application Ser. No. 08/775,523, filed Jan. 2, 1997, entitled "Miniature Molded Ceramic Devices Having Embedded Spiral Coils" by Chatterjee et al, and commonly assigned U.S. patent application Ser. No. 08/775,524, filed Jan. 2, 1997, entitled "Method for Forming Molded Ceramic Devices Having Embedded Spiral Coils" by Chatterjee et al which are incorporated herein by reference.

(c) features like microchannels can be formed by embedding sacrificial member which burn away during sintering or can be incorporated in the molding tools.

During the sintering process the green ceramic layers shrink. Provision must be made to compensate for this shrinkage.

Figure 2:
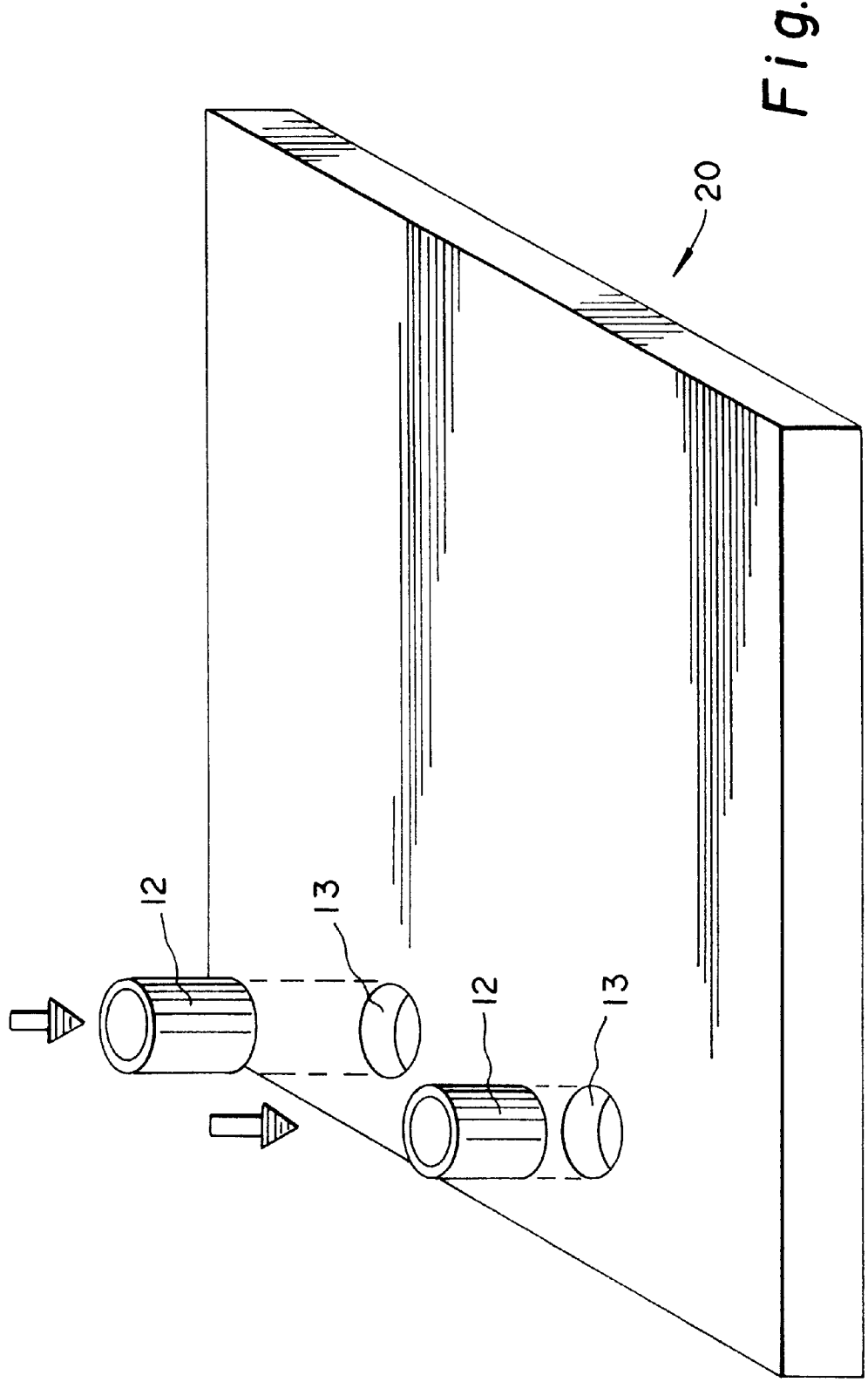
FIG. 2 is a perspective of the first layer of the ceramic body including the top portion.

Referring to FIG. 2 a perspective is illustrated of a micromolded ceramic top layer 20 comprising inlet tubes 12. A plurality of tubes 12 forming a row are placed directly on through-holes 13. These tubes 12 provide passages into a reaction chamber 34 (shown in FIG. 3) for delivering fluids into such reaction chamber 34.

Figure 3:
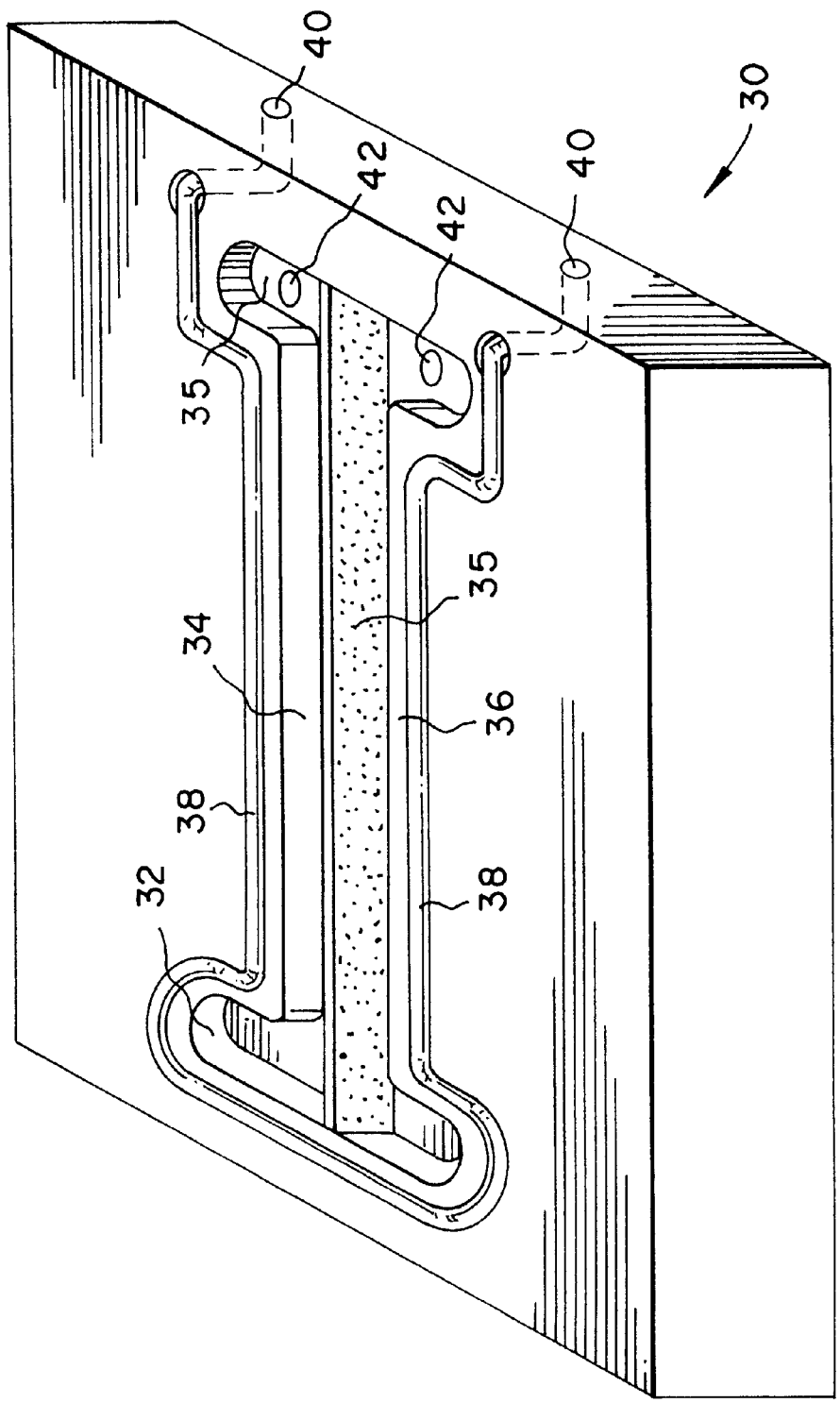
FIG. 3 is a perspective of the second layer from the top of the ceramic body showing the reaction chamber and permeable wall within such reaction chamber.

Referring to FIG. 3, a perspective is illustrated of the second layer from the top 30 wherein contained a reaction chamber 34, a receiving chamber 32 for receiving the raw chemicals from the top layer via the tubes 12 inserted into the inlet holes 13 and a discharge chamber 35 for delivering the chemicals to the next level through the discharge holes 42. The fluids are delivered to opposite sides of the reaction chamber 34 which are separated by a permeable partition wall 36. The permeable partition wall 36 is preferably made by dry pressing ceramic and its composite powders such as zirconia silicate, alumina silicate, zirconia, alumina, silicon carbide, silicon nitride and ceramic composites comprising zirconia-alumina at a pressure such that upon sintering the desired degree of porosity is maintained. The permeable partition wall 36 can also be made alternatively by gel casting, tape casting and injection molding zirconia silicate or alumina silicate such that upon controlled sintering a varying degree of porosity is achieved. The permeable partition wall 36 permits controlled reaction between the chemicals in the fluids on either side of the permeable partition wall 36 to permit the mixing of such fluids during a reaction process. The ceramic powder is blended with polymeric fibers such as polyvinyl alcohol, polyethylene glycol or acrylic which upon sintering leaves behind interconnected micropores. The pore size or the diameter of the sacrificial organic fibers vary in a of range from 0.1 to 10 $\mu$m. because the degree of porosity (density) is warranted by the amount of permeability required for a given chemical process. In other words, custom tailored permeability can be incorporated by controlling the compacting pressure, diameter of the polymer fibers and sintering temperature for a given ceramic composition. The preferred way of making the green permeable partition wall 36 containing sacrificial organic fibers such as polyvinyl alcohol, is to gel cast the ceramic mixture containing the organic binders and organic fibers in a mold and air drying the part to drive off the solvent. Upon compacting and subsequent firing the sacrificial organic fibers will produce a wall having a variable degree of porosity. The permeable partition wall 36, which is in the green state, is then incorporated in the unitary ceramic green body before all the layers are assembled and sintered to form the sintered unitary micro-ceramic chemical plant. It is instructive to note that a plurality of channels can be provided to handle more than two chemicals or alternatively the reaction chamber 34 can be made longer by configuring serpentine, complex, wavy, winding and angular meandering forms to allow for longer reaction time. An embedded ceramic heating element 38 is provided in walls defining the perimeter of the reaction chamber 34 to provide heat to the reaction chamber 34. The embedded heating element 38 can be made from ceramics such as $MoSi_2$, $TiB_2$, $ZrB_2$, or high-temperature resistive metals or metallic alloys. The electrical leads 40 for the embedded heating element 38 are located at the side of the ceramic second layer 30 defining the perimeter of the reaction chamber 34, and is an integral part thereof. The reaction chamber 34 leads to discharge holes 42 contained in the discharge chamber 35 which merges into the next layer 100. The cross-section of the reaction chamber 34 is configured as a rectangle but can be of other shapes such as oval, circular, triangular or any other convenient cross-section. The discharge holes 42 are directly connected to a receiving channel 60 in the next layer 100.

Referring to FIG. 4, a perspective is shown of the filtering chamber 100 of the unitary ceramic block 10 having a ceramic layer provided therein microfilters 82 and 84 and fluid transfer channel 70. The microfilters 82 and 84 separates the solid reaction products from the fluid and permits the retrieval of desired solid reaction products. The discharge-holes 42, located in the second layer 30, feed the chemical to a receiving channel 60 from where it is distributed to a filtration channel 70. The filtration channel 70 include outlets through holes 64 and 68 for retrieving the desired reaction products (filtered solids) from the integrated micro-ceramic chemical plant. Also provided are through holes 62 and 66 which are connected to outlet holes 64 and 68 for evacuating undesired solid reaction products. Optional valves (not shown) can open or close the outlet holes 64 and 68 respectively, on demand. Through-hole 80 which is in communication with the next layer 200 is provided to deliver desired fluids from the reaction chamber 34 to the bottom layer 200 where they are removed from the integrated micro-ceramic chemical plant.

Referring to FIG. 5, a perspective is shown of the bottom layer 200 which includes receiving channels 180 to receive fluids from the previous layer 100 to be distributed to a point outside the integrated micro-ceramic chemical plant through the tubes 182. The bottom layer 200 is also provided with integrated heating elements 184 in order to provide means to heat the unitary ceramic body 10. The embedded heating coils 184 can be made from ceramic materials such as $MoSi_2$, $TiB_2$ or $ZrB_2$ or high temperature metallic alloys such as Nichrome (Ni—Cr alloys used commercially as heating elements) and Mo. The electrical leads 186 for the heating elements 184 are located at the side of the ceramic plate and is an integral part of it. In order to monitor and control the temperature, a feed-through 190 which extends up to the wall of the chamber is provided which protrudes at an angle from outside to the surface of the ceramic layer 200. A thermocouple can be introduced through the inlet hole 190 to measure as well as control the temperature. This thermocouple is connected through a feed back control system to the heater power supply.

The invention has been described in detail with particular reference to certain preferred embodiments thereof, but it will be understood that variations and modifications can be effected within the spirit and scope of the invention.

PARTS LIST 10 integrated micro-ceramic chemical plant
12 inlet tubes
13 through-holes
20 first layer/top ceramic plate
30 second layer
32 receiving chamber
34 reaction chamber
36 permeable wall
38 embedded heating element
40 through-holes
42 discharge holes
60 receiving means
62 through-hole
64 outlet hole
66 through-hole
68 outlet hole
70 filtration channel
80 through-hole
100 third ceramic layer/filtering chamber
180 receiving channel
182 discharge tube
184 embedded heating coil
186 electrical leads
190 through-hole
200 bottom ceramic layer
35 discharge chamber

What is claimed is:

1. An integrated micro-ceramic chemical plant having a unitary ceramic body formed from multiple ceramic layers in the green state which are sintered together comprising:

(a) the unitary ceramic body defining a reaction chamber and first passage means for providing communication with the reaction chamber so that two or more fluids may be delivered to such reaction chamber, a permeable partition wall being provided within the reaction chamber to permit the mixing of fluids during a reaction process;

(b) the unitary ceramic body defining a filtering chamber including filtering means disposed in such chamber for separating the solid reaction products from the fluid and for retrieving solid reaction products;

(c) the unitary ceramic body defining second passage means for directing the solid reaction products to exit from the unitary ceramic body and (d) the unitary ceramic body defining third passage means for directing the liquid reaction products to exit from the unitary ceramic body.

2. The integrated micro-ceramic chemical plant of claim 1 wherein the first and second passage means are selected to have a circular, oval, triangular, or rectangular cross-section.

3. The integrated micro-ceramic chemical plant of claim 1 wherein the permeable wall is a ceramic made by dry pressing zirconia silicate or alumina silicate at a varying pressure such that upon sintering a varying degree of porosity is achieved.

4. The integrated micro-ceramic chemical plant of claim 1 wherein the permeable wall is a ceramic made by gel casting, tape casting and injection molding zirconia silicate or alumina silicate such that upon controlled sintering a varying degree of porosity is achieved.

5. The integrated micro-ceramic chemical plant of claim 1 wherein the permeable wall is a silicate at a pressure such that upon sintering at a varying temperature a variable degree of porosity is achieved.

6. The integrated micro-ceramic chemical plant of claim 1 wherein the permeable wall is a ceramic comprising zirconia, alumina, silicon carbide, silicon nitride and ceramic composites comprising zirconia-alumina.

7. The integrated micro-ceramic chemical plant of claim 1 wherein the ceramic permeable wall is mixed with sacrificial organic fibers which upon compacting and subsequent firing a variable degree of porosity is achieved.

8. The integrated micro-ceramic chemical plant of claim 7 wherein the diameter of the sacrificial organic fibers vary from 0.1 to 10 $\mu$m.

9. The integrated micro-ceramic chemical plant of claim 1 further including an embedded ceramic heating element defining the perimeter of the reaction chamber.

10. The integrated micro-ceramic chemical plant of claim 9 wherein the heating element is a coil formed of $MoSi_2$, $TiB_2$, $ZrB_2$, high temperature resistive metals or metallic alloys.

* * * * *